(12) United States Patent
Thompson

(10) Patent No.: US 8,417,685 B2
(45) Date of Patent: Apr. 9, 2013

(54) COLLABORATIVE SEARCH NETWORK

(76) Inventor: Brandon Thompson, Indianapolis, IN (US)

( * ) Notice: Subject to any disclaimer, the term of this patent is extended or adjusted under 35 U.S.C. 154(b) by 52 days.

(21) Appl. No.: 13/076,426

(22) Filed: Mar. 31, 2011

(65) Prior Publication Data

US 2012/0254224 A1    Oct. 4, 2012

(51) Int. Cl.
*G06F 7/00* (2006.01)
*G06F 17/30* (2006.01)

(52) U.S. Cl.
USPC .......................................................... 707/706

(58) Field of Classification Search .................. None
See application file for complete search history.

(56) References Cited

U.S. PATENT DOCUMENTS

| | | | |
|---|---|---|---|
| 6,836,769 B2 | 12/2004 | Lunenfeld | |
| 2007/0174244 A1* | 7/2007 | Jones | 707/3 |
| 2008/0016218 A1* | 1/2008 | Jones et al. | 709/226 |
| 2008/0051064 A1* | 2/2008 | Jones et al. | 455/412.2 |
| 2009/0089296 A1 | 4/2009 | Stemeseder | |

OTHER PUBLICATIONS

HP-UX Reference Oct. 1987, Hewlett Packard, Release 11.0 vol. 1, Section 1-741 through 1-743.*
Kurose et al., Computer Networking: A Top-Down Approach Featuring the Internet 2001, Addison Wesley, pp. 280-297.*

* cited by examiner

*Primary Examiner* — Jason Liao
(74) *Attorney, Agent, or Firm* — Joshua Kaplan, Esq

(57) ABSTRACT

The invention relates to a collaborative searching network having at least one intelligent client, a network medium capable of linking the intelligent client with at least one other intelligent client. The disclosed intelligent client is capable of receiving a data search request; and said intelligent client capable of responding with a data search result to said data search request by retrieving data from at least said one other intelligent client or a from computer network.

20 Claims, 4 Drawing Sheets

COLLABORATIVE SEARCH NETWORK

FIELD OF THE INVENTION

The invention relates to a data search engine, in particular to a network of intelligent computing devices capable of assisting each other in producing accurate and rapid search results.

BACKGROUND OF THE INVENTION

Today's internet searching is a tedious task that typically begins with interrogating a search engine with queries, reviewing the response to the query, then ranking and classifying, until a suitable set is achieved. For each new search, this painstaking process is repeated by every person or a computer program looking for information on the internet. Each user individually submits queries and separately reviews the results. This process is repeated a multitude of times, even if thousands of other users already searched for the same thing and had already paired the search response from the search engine down to the same or similar set. The present invention will help unify internet searching that is presently being conducted in a disconnected fashion.

Presently collaborative search method must be undertaken contemporaneously, or by a group of searchers working together on a common goal. However, once each member tries a separate and unrelated search, this member will no longer benefit from a team effort, and will instead be forced into the traditional, individual effort of identifying relevant information from millions of probable results. The present invention is particularly useful for scientific and engineering research, where searching tends to be complex and multi-tiered. Currently collaborative research can only be undertaken by universities and think tanks and has to be especially funded due to resources and time involved. However, students or doctorate candidates, who do not have sufficient resources to fund such collaboration, are presently forced to do all of their electronic research alone. Therefore, a pool of prior searches from, for example several schools or campuses, which functions passively and autonomously will be a tremendous low cost enhancement for such uses.

The present invention revolutionizes data searching by creating a constant, passive team of research collaborators where individual search results are available for look-up and review by other participants. It would be preferable potential members are required to agree or consent to participate in the search network. Once consent is obtained. it would not matter which particular searches are going to be executed, alternatively a consent can be obtained prior to each search. Each search by the participants embodied in the present invention is able to access an existing bank of search results and can further improve or create a new set of search results. Instead of starting from scratch each time, each research effort improves an existing knowledge base.

In the preferred embodiment of the present invention there is no requirement for expensive computer processing and storage hardware since searches are stored on each client machine that ran the search, with just an identifying stub being sent to a central intelligence unit or to other intelligent clients. Any combination of data search request and the identifying stub creates a coordinate value of the member of the collaborative network. If the search result is lost or can no longer be accessed, the present query and similar subsequent queries will rebuilt this result for the particular collaborative search community by having the current user pair down results to the most relevant subset. In this manner all members have a common incentive in sharing their search results, because by sharing their search results now, they can avail themselves of search results in the future. Furthermore, the present invention does not require any guarantee accuracy or availability of information, since results can be created or supplemented at any point in the future through additional searching.

DESCRIPTION OF THE RELATED ART

U.S. Pat. No. 6,836,769 describes a client-server multitasking process comprising: receiving a request comprising searching criteria, comprising search queries, at least two of which comprise different query values directed to different server addresses, criteria specifying for which request group information is to be returned; for the search queries in the specified request group, sending to the server designated by the server address a query derived from the corresponding search query; receiving response information from the servers; processing the response information into a plurality of return groups by associating a different query value with a different one of the return groups and merging into the return group the response information from the servers that received queries directed to the query value associated with the return group; incorporating into the return group means for inputting at least one request for ordering at least one item; consolidating the return groups into a consolidated response; returning the consolidated response.

US Pat. App No. 20090089296 discloses a system for automated aggregation, and possible augmentation, of search results generated or otherwise provided in response to search queries/requests to multiple network resources, such as search engines, the search requests being originated by client devices; at the direction of a server, to the various network resources. In one embodiment, a user, using a client device, enters a search request which is provided to the server. The search request, which may comprise one or more search terms, may be entered via a web based or client based interface/application provided via the client device. As will be described, the client device may be any device capable of accessing the server and network resources via a network, such as the Internet. Exemplary client devices include a computer, cell phone, personal digital assistant, network appliance, etc. The server identifies which network resources, out of a set of available network resources, are likely to provide relevant results to the user's query. The server may further modify the search request to increase the likelihood that the search request will return relevant results. The identified list of resources is then provided back to the client device, along with the modified search request if applicable, which then originates and transmits the search request to each of the identified resources or subset thereof. The search results may then be received and presented to The user by the client device. Alternatively, the search results may be passed to the server which processes the search results and then provides the processed search results back to the client device for presentation to the user.

Various implements are known in the art, but fail to address all of the problems solved by the invention described herein. One embodiment of this invention is illustrated in the accompanying drawings and will be described in more detail herein below.

SUMMARY OF THE INVENTION

The invention relates to a collaborative searching network having at least one intelligent client, a network medium capable of linking the intelligent client with at least one other intelligent client. The disclosed intelligent client is capable of receiving a data search request; and said intelligent client capable of responding with a data search result to said data search request by retrieving data from at least said one other intelligent client or a from computer network.

Therefore, the present invention succeeds in conferring the following, and others not mentioned, desirable and useful benefits and objectives.

It is an object of the present invention to provide a search engine.

It is another object of the present invention to provide a network of clients capable of collaborating together to obtain search results.

It is another object of the present invention to provide a search engine that is capable of applying a team approach to internet searching Yet another object of the present invention is to provide a having at least one intelligent client or a central intelligence unit connected to an intelligent client.

Yet another object of the present invention is to provide a collaborative network that is almost entirely virtual, with all nodes residing within the world wide web and not on a physically private network.

Still another object of the present invention is to provide a for intelligent clients that may be personal computers, smart communication devices, smart terminals or any other type of computing electronic devices.

Still another object of the present invention is to provide a collaborative network capable of searching the internet for search results.

Still another object of the present invention is to provide an intelligent client capable of engaging the internet, processing a query and responding with search results.

Yet another object of the present invention is to provide an intelligent client capable of storing and indexing prior search results.

Still another object of the present invention is to provide a central intelligence unit or an intelligent client capable of tracking prior search queries and hashing these queries to network members that ran them.

Still another object of the present invention is to provide a method that teaches a collaborative interne searching by a passive team of researchers as opposed to a coordinated team that deliberately acts with a common objective.

Yet another object of the present invention is to provide a method that teaches a method of establishing a community of users that are able to provide query results to each other.

Still another object of the present invention is to provide a method having a step of evaluating the difference in response time between local collaborative network and a general interne search.

DESCRIPTION OF THE PREFERRED EMBODIMENTS

Figure 1:
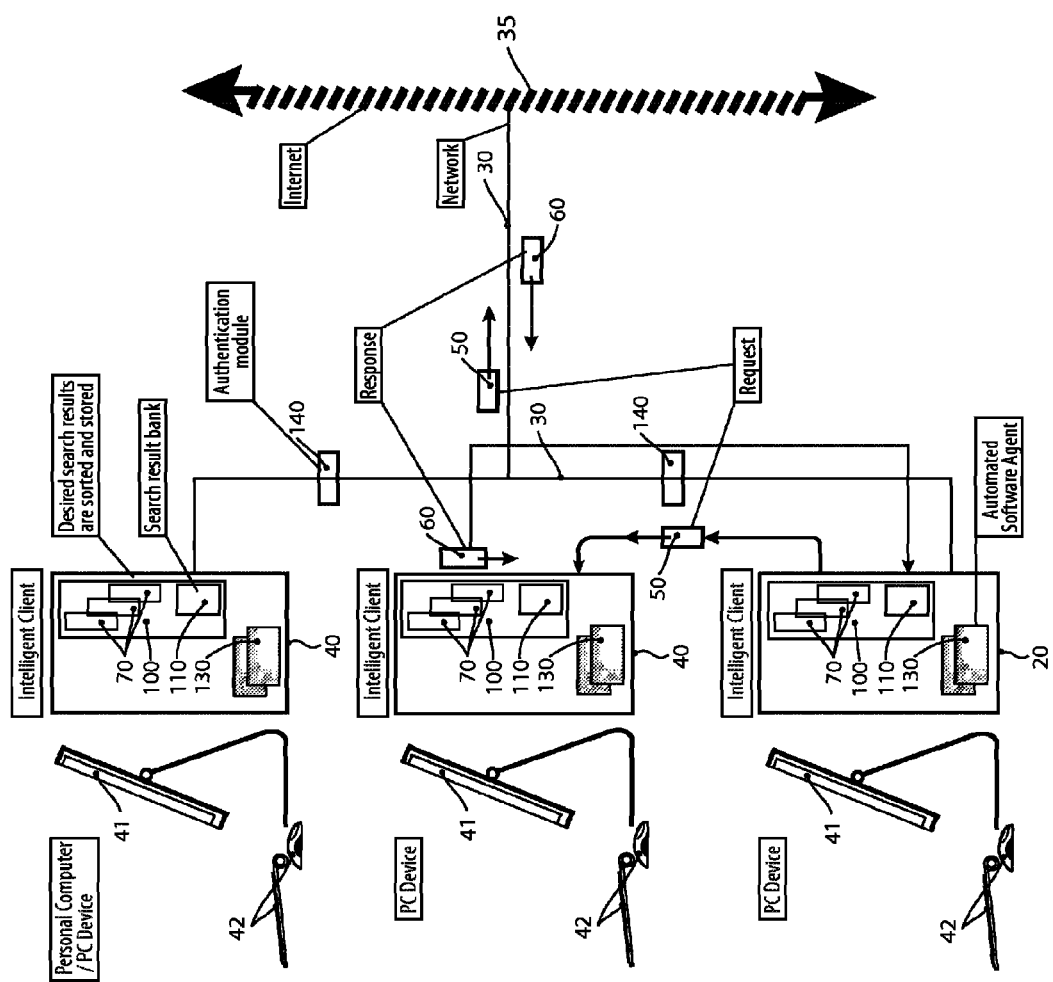
FIG. 1 is a diagram of a preferred embodiment of the present invention.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 illustrates a preferred embodiment of the present invention. Shown here are a collaborative searching network 10, at least one intelligent client 20, a network medium 30, at least one other intelligent client 40, a data search request 50, a data search response 60, a data search result 70, a data retrieval 90, a sorted storage of a search result 100, a data search result bank 110, an automated software agent 130, and an authentication mechanism 140. Also shown is a display screen 41, and input devices 42 namely a keyboard and a mouse. The display and input devices are used by a user of the present invention to input a search query and obtain visual results via the display screen 41. Other interactive devices may also be used, such as but not limited to, audio and printer devices, voice activated input devices, touch screens and digital writing pads. Shown is a preferred embodiment of a the invention running on a personal computer. However, one skilled in the art will appreciate that the invention may be transposed on a phone that may be wired or wireless, or any other digital device or organizer.

The collaborative searching network 10 is shown as a loosely bound set of physical or logical computers or intelligent clients 20 and 40 that are capable of communicating with each other over a network medium 30. Each intelligent client 20 and 40 may typically be deployed in an independent sub-network that in turn connects to the world wide web, also known as the internet, or may each reside on the same private network 30, which connects to other networks 30. These networks (not shown) may have additional intelligent clients 20 and 40 that are part of the same collaborative searching network 10.

The intelligent clients 20 and 40 locate each other via the Transmission control protocol (TCP/IP) or any other network addressing protocol known in the art. One skilled in the art would appreciate that a network medium 30 refers to an environment where signals are being sent and received over a medium that may utilize an Ethernet, a wireless LAN, an optical fiber, a microwave, radio or infrared waves, or any combination thereof. Signals travel from source intelligent client 20 to a target other intelligent client 40 using an electronic address schema supported by network protocols known in the art, which include but are not limited to telephonic communication protocols. The addresses of both intelligent clients 20 and 40 is reported to and being tracked by a domain network service (DNS) running on a centralized server or router or any other type of packet switching device that manages or facilitates communication within such a network. Individual signals may be further directed along a typical network medium 30 over physical layer using switches, hubs and repeaters and or by means of any other devices and cables found in a typical network.

The intelligent client 20 preferably generates the data search request 50. The data search request 50 is then routed to the other intelligent client 40 this is likely to contain the desired search result 70. If the desired search result 70 is found, the process of data retrieval 90 occurs, where the search results are aggregated into a single data packet or a series of data packets that are sent back to the requesting intelligent client 20 of form of a response 60. Such data packets may be created within a context of internet protocol (IP), or Short Message Service (text messaging) or any other type of message protocol known in the art. One should appreciate that the roles of the intelligent search client and the other/target intelligent search client may constantly reverse as the intelligent client 20 may that issues the search request 50 may be similarly called upon to produce the result 60 by the other intelligent client 40. It is therefore preferable that the terms intelligent client and the other intelligent client are a mere semantics that refer to computing devices of same or similar capabilities or devices of different capabilities. The one skilled in the art may further appreciate that the enabling description of the present invention may be varied in significant ways without departing from the overall purpose of the invention, that primarily being a peer to peer network that facilitates collaborative querying and data retrieval.

Still referring to FIG. 1, the collaborative search network 10 may preferably be maintained and enforced by an automated software agent 130. The automated software agent 130 is preferably an application written in a high level language, such as, but not limited to C#, C++, Java or any other computer language known in the art. The automated software agent 130, may also contain markup and string parsing capabilities by utilizing Shell, Perl, XML, HTML or any other markup or data parsing techniques. Such string parsing capabilities may be required to interact with system processes found on that particular intelligent client device, or to deploy installation and upgrades of the automated software agent 130. It may also be appreciated by one skilled in the art, that the automated software agent 130 may function within a commercially available framework, such as but not limited to .Net Framework, WebSphere, Jboss, Tomcat or any other application server framework known in the art. Alternatively, the automated software agent 130 may interact directly with system and hardware resources offered by a typical Operating system, such as, but not limited to Windows OS, Apple Macintosh, Unix, Linux, Aix or Solaris. The automated software agent 130 may listen for connections from packets sent by intelligent clients 20 and 40 by registering a port in a Portmapper type Utility found on Unix and Windows, or by utilizing a similar Utility in another operating system. Alternatively, the automated software agent 130 may utilize a Uniform Resource Locator (URL) addressing registered with a local web server, such as IIS, Iplanet or Apache or any other web server known in the art. One skilled in the art will appreciate that any other types of addressing paradigms and infrastructure can be used to enable the flow of data between intelligent clients 20 and 40 or any other members embodied in the present invention.

The automated software agent 130 may provide its own search interface (one example shown in FIG. 2A) that is capable of accepting a search request 50 and displaying a search result 60. Alternatively, the automated software agent 130 may be installed as wrapper software around an internet browser's native application programming interface or API. In yet another alternative the automated software agent 130 may listen to entries being made into a freely available search engine, such as but not limited to Google, Yahoo or Bing, or any other search engine available. The latter arrangement can be accomplished by initially activating a wrapper utility around a Google search window, which would be triggered when a URL for Google or some other search engine is entered into a web browser. It will be appreciated by the one skilled in the art that the present invention may be used with any type of web browser, such as but not limited to Internet Explorer, Firefox, Chrome, Opera or any combination thereof.

This wrapper software would preferably function by first accepting the search request string as input from the user, which would then be passed to the automated software agent 130. The automated software agent 130 then tries to determine whether a search result 60 can be obtained from another intelligent client 40 within the collaborative searching network 10. If the automated software agent 130 determines that such a search result cannot be obtained from any of the other intelligent clients 40 on the collaborative network 10, it will pass the search request 50 to the Google search engine, or another search engine, which will perform a standard internet based search.

For the purpose of this disclosure the terms internet or computer network are used to refer to a two or more computers or other processing devices linked together by a network medium. The Internet is a global system of interconnected computer networks that use the standard Internet Protocol Suite (TCP/IP) to serve billions of users worldwide. It is a network of networks that consists of millions of private, public, academic, business, and government networks, of local to global scope, that are linked by a broad array of electronic, wireless and optical networking technologies. Within this definition, the term computer network may refer to the internet or to a more localized network.

Figure 2:
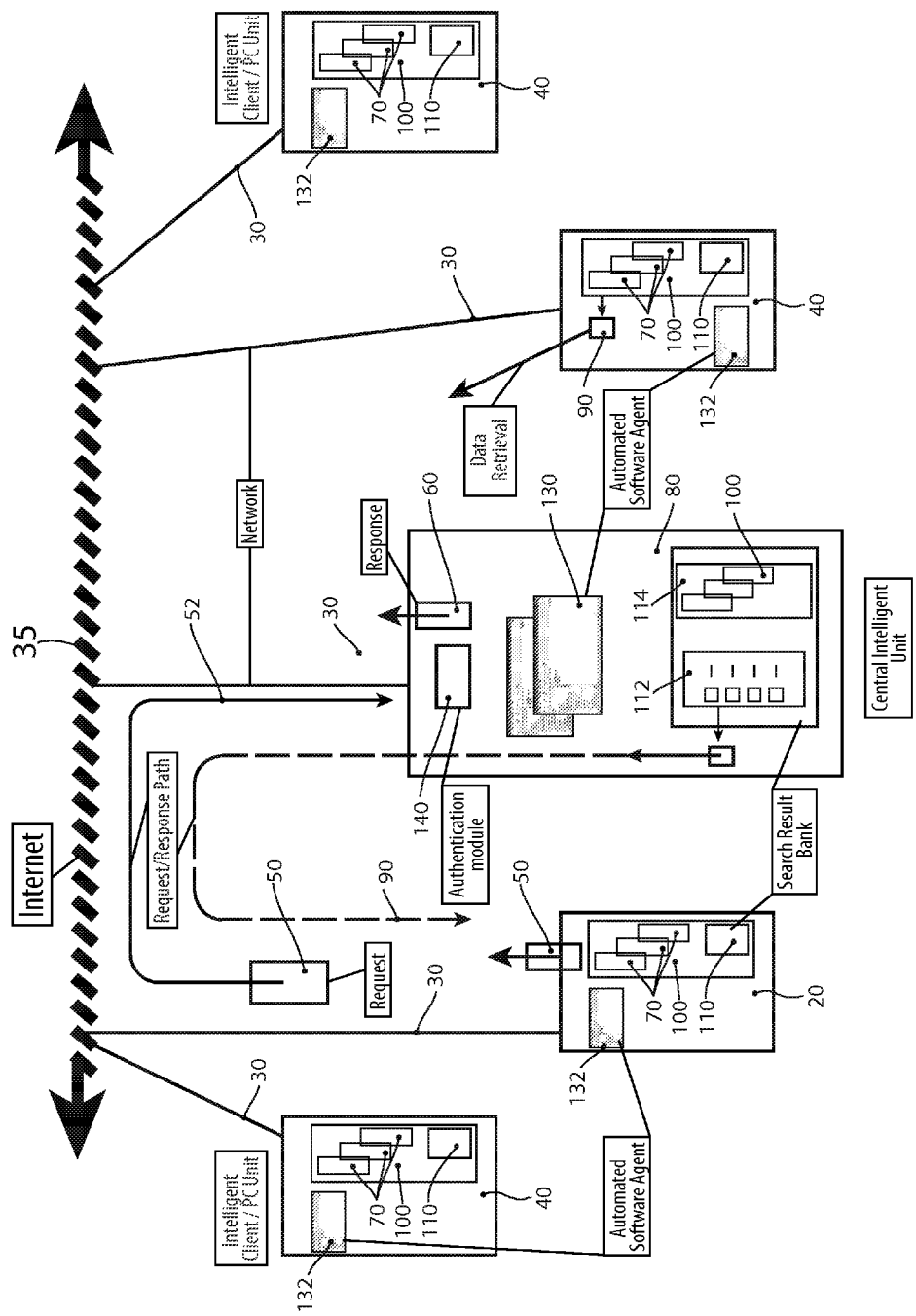
FIG. 2 is an alternative embodiment of the present invention.

The search result 60 is preferably stored locally by the intelligent client 20. The automated software agent 130 is preferably capable of recording the search query 50 and result 60 by storing the actual query string, a compressed search result and a stub, or coordinate value of a collaborative network member, which may be a file that would record the address or identifying information of the intelligent client 20, as well as the compressed search result This search query and stub would then be communicated to all the other automated software agents 130 running on other intelligent clients 40 within the collaborative search network 10 or to the agent 130 running on a central intelligence unit 80 (FIG. 2). The automated software agent 130 thus keeps track of searches and search results and track of intelligent clients executing them, both locally 20 and by other clients 40.

As a further enhancement, the automated software agent 130 may write search results and queries into a database that may be subdivided for viewing into a series of indexes which are then sorted by age. Thus a quick search would only look through most recent indexes and a more thorough and time consuming search would interrogate additional indexes or a complete set of indexes. The automated software agent 130 may use a commercially available database server to support its storage requirements or may compile its own storage files using raw data devices, comma separated files or hashed file combinations or any other known or novel means of organizing and storing large amounts of data. It may be highly desirable that the automated software agents 130 within the same collaborative network 10 have a mechanism for syncing up their local records against records circulated among each intelligent client 20 and 40 and central intelligence unit 80 (FIG. 2), so that the content of the data search result bank 110 builds up content over time, while remaining uniform among all of the intelligent clients 20 and 40 within a particular collaborative search network 10.

Still referring to FIG. 1, the authentication mechanism 140 may be a commercially available firewall, a security utility provided by the automated software agent 130 or a hardware authentication device, such as a router or a proxy server. The authentication mechanism 140 may also be enabled through a synchronized circulation of encryption certificates among all of the members of the collaborative searching network 10, with members being the intelligent clients 20 and 40 or the central intelligence unit 80 (FIG. 2). Each message circulating within such a collaborative search network 10 would then be encrypted using the protocol or key specified by such a certificate. The authentication mechanism 140 is highly preferable but may not represent one of the essential components of the present invention.

Collaboration and communication among the members of the collaborative searching network 10 may also preferably be conducted through the automated software agent 130. The automated software agent 130 may be capable of supplying authentication data to outgoing search requests 50 and incoming search requests 50, as well as authenticating other traffic to and from intelligent clients 20 and 40. The authentication 140 may be in form of certificates shared among members, or with login and password. In case of login password authentication, each intelligent client 20 would preferably be required to register with all other intelligent clients 40 and vice versa or with the central intelligence unit 80 (FIG. 2). There may be other authentication alternatives which are implied here but not expressly enumerated.

As mentioned above, the automated software agent 130 is preferably capable of determining the most efficient path of returning search results to the data search requests 50. One way how this may be accomplished is with the automated software agent 130 first reviewing the search result bank 110 that is local to the physical machine, where this instance of the software agent 130 is running, with the objective of verifying whether such a search query 50 has ever been executed before and at what intervals. If the same or similar query 50 is not located locally, the other intelligent client 40 or the central intelligence unit 80 (FIG. 2) that is on record for having the data search result 70 would then be interrogated in a similar way. The response time for this process would then be recorded in a separate variable. The automated search agent 130 may also run a preliminary search using a known internet search engine to determine the initial pool of results that a user may have to sift through. The automated search agent 130 may then compare the two paths and attempt to estimate which would lead to greater precision, which path would require additional sorting by the requester, and with both of these factors in mind, which path would take longer. There may still be other algorithms for evaluating most efficient path that determine the best search route to take for a given query.

Turning now to FIG. 2, there shown is another embodiment of the present invention. Shown is a collaborative searching network 10, at least one intelligent client 20, a network medium 30, at least one other intelligent client 40, a data search request 50, a response 60, a data search result 70, a central intelligence unit 80, a data retrieval 90, a search result sorting and storing 100, a data search result bank 110, a data search query 120, an automated software agent 130, and an authentication 140. In this embodiment, a central intelligence unit 80 is responsible for maintaining and managing the collaborative searching network 10. Shown also is a typical path 52 of a data search request 50, originating from the intelligent client 20 and destined for the central intelligence unit 80. A data retrieval and response shown as 90 is being sent in response from the central intelligence unit 80. In this case the responder is the central intelligence unit 80, but may also be one of the other intelligent clients 40. The central intelligence unit 80 or one of the other intelligent clients 40 may be initially responding with the location of the desired data search result 70 and the client 20 would need to make a subsequent request directed at the actual location of this search result 70.

The central intelligence unit 80 may be a single server or a cluster of servers, running Windows or UNIX or Linux flavor or any other known operating system. The central intelligence unit 80 may preferably be capable of increased data throughput and data storage to provide support a large number of simultaneous requests 50 and responses 60 from various intelligent clients 20 and 40.

The automated software agent 130 as shown in FIG. 2 may primarily be running on the central intelligence unit 80 and may have listener or client processes 132 on intelligent clients 20 and 40. Alternatively, the automated software agent 130 may be the same everywhere, with the automated software agent 130 residing on the central intelligence unit 80 capable of assuming greater responsibility. In the latter embodiment, a fail-over scenario may include one of automated software agents 130 residing on one of the intelligent clients 20 or 40 assuming greater responsibility in the event of a failure of the central intelligence unit 80 or any software component thereon.

Still referring to FIG. 2, the intelligent clients 20 and 40 may be but are not limited to personal computers, web books, electronic personal assistants such as Apple® ipads, personal organizers, cellular phones, television units with or without internet hookup, or any other devices having an internet hookup or an ability to connect to a network. All of such devices may be equipped with a version of automated software agent 130 for storing and sorting queries 100 in a local search result bank 110 or on a result bank 110 residing on the central intelligence unit 80, or in an independent third location accessible by either the central intelligence unit 80 or the intelligent clients 20 and 40.

In the embodiment shown in FIG. 2, when a user of an intelligent client 20 or 40 enters a query, it is first processed by an automated software agent 130 that is running locally or on the central intelligent unit 80. The automated software agent 130 tries to determine if this search query was ever executed before by user or by another intelligent client 40 or by the same intelligent client 20. To do so, the automated software agent 130 may access a list of prior queries 114 that is preferably mapped according to last access date or according to the address of an intelligent client 20 or 40 that hosted such a search before and has stored the response in its search bank 110. Such a list may be in form of a hash table 112. Alternatively, this may be a series of tables in a database having relevant fields mapped to each other with the interne addresses of intelligent clients 20 and 40 serving as primary keys. In another alternative, recognizing that internet addresses often change, individual intelligent clients 20 and 40 may be tracked based on user id or unique identifier used by the user to participate in the collaborative network 10. The unique identification need not be linked to a specific physical device, but may be linked to a specific user or organization. Such an identification may be passed between intelligent clients 20 and 40 after first being authenticated by the authentication module 140. These identifiers may be, but are not limited to cookies and certificates. Issuance, tracking and maintaining of such identifiers may be assigned in whole or in part to the automated software agent 130 residing on the central intelligence unit 80. Issuance, tracking and maintenance of identifiers or other security features may also be performed by the authentication module 140 or by a third party security product that may be able to interact with the automated software agent 130, through a series of API calls.

Still referring to FIG. 2, the automated software agent 130 residing the central intelligence unit 80 may preferably be capable of maintaining a status list of intelligent clients 20 and 40 that sent a search query 50 or a response 60, or which have acknowledged a polling request from this automated software agent 130. The list of such intelligent clients 20 and 40 may be stored entirely on the central intelligence unit 80 or may be circulated throughout the collaborative search network 10. Identifiers or logins into the collaborative search network may be physical servers or may be based on individual users and not connected with any particular physical device. Such identifiers may be unique user names assigned to individual users or unique numeric or alphanumeric identifiers assigned to each intelligent client 20 or 40. In yet another alternative each intelligent client may be authenticated based on it Media access control or Mac address of its network interface or by any combination of factors. Any type of intelligent client authentication would preferably be carried out by the authenticator process 140, which may be a firewall or a network based service, such as but not limited to Network Information System (NIS), Lightweight Directory Access Protocol (LDAP) or by any other Means. The authenticator process 140 may reside on the central intelligence unit 80 or on the intelligent clients 20 or 40, in which case each authenticator process 140 may be synchronized among all network members or may be independent for each specific member. The authentication may also be stateless with the authenticator 140 recognizing a specific key used by members, with this key being shared among members.

FIG. 2 is shows that intelligent clients 20 and 40 as well as the central intelligence unit 80 all reside on independent networks that connect to the internet 35 or intelligent clients 20 and 40 that connect directly to the world wide web 35. The internet 35 in this case is a world wide web of interconnected computers, where all computers are referenced by unique TCP/IP addressing system. The internet may also be a network of communication devices, with intelligent clients 30 and 40 being telephones or other kinds of communication devices capable of communicating using a protocol suitable for such an environment. Thus the intelligent clients 20 and 40 may be but are not required to be linked to the central intelligence unit 80 or with each other in a close network topology. It is preferable that the automated software agents 130 on the intelligent clients 20 and 40 maintain the internet coordinates of the central intelligence unit 80, or that the automated software agent 130 on the central intelligence unit 80 maintains the identifying information and network coordinates each individual intelligent client 20 or 40.

It is preferable that the automated software agent 130 residing on the central intelligence unit 80 or the one residing on the intelligent clients 20 and 40 be capable of determining the most efficient way of delivering a search response 60. This may be done by estimating search response time and degree of precision when searching using a known search engine versus search response time and degree of precision when searching for results among members of the collaborative search network 10. In an alternative embodiment, a user may be presented with a choice of searching directly via the internet bypassing the collaborative search network 10 or to first attempt to obtain results from at least one other intelligent client 40 within the collaborative search network 10 and if that is not successful to try a broader internet search, or stop searching altogether.

In another alternative, more than one collaborative searching networks 10 may be linked together to expand the size and collaborative search capability of the present invention. Depending on scale of a typical network, there may be a need to introduce sub units of central intelligent unit 80 (not shown) that may be subservient to one or several main central intelligent units 80 or may be collaborative but independent from each other. Multi-collaborative network architecture may minimize the time it would take to search the entire combined collaborative network by first searching a local circle of intelligent clients 20 and 40, and only then expand to other intelligent clients by handing off the request to more centralized central intelligent units 80, or to collaborating peer central intelligent units.

Figure 2A:
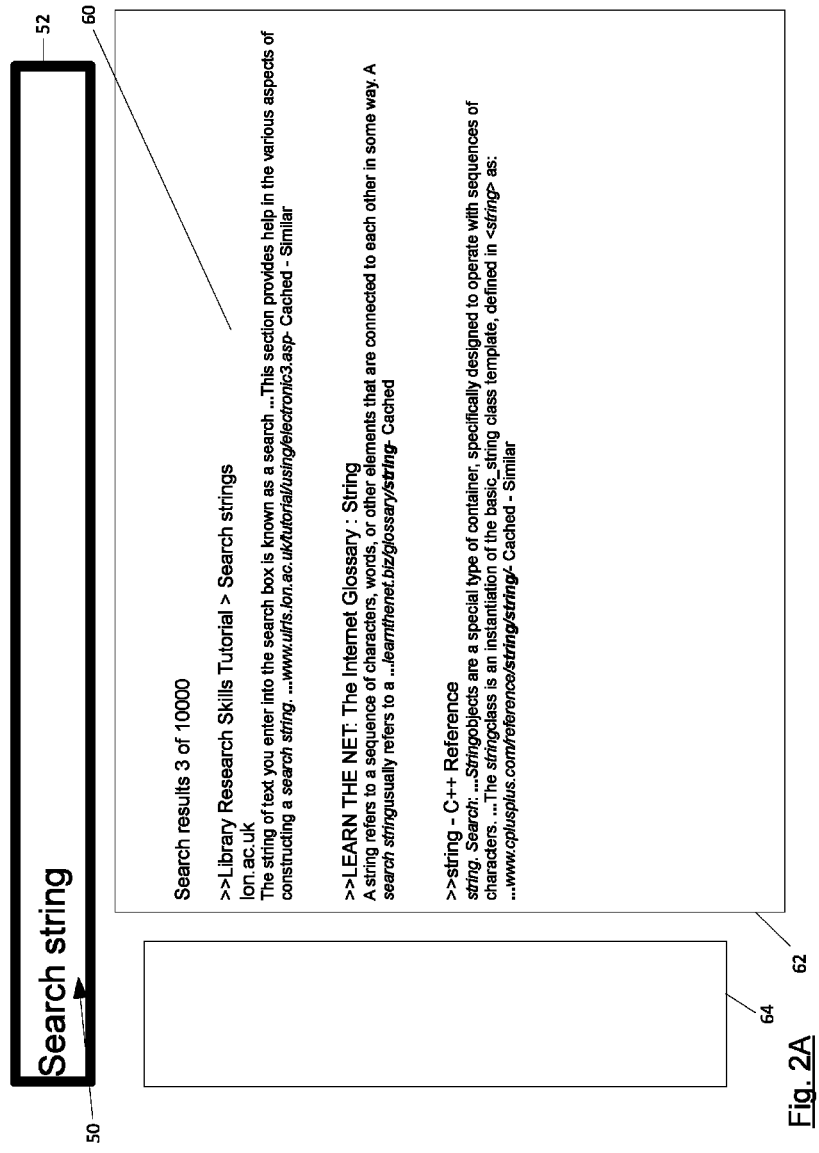
FIG. 2A is an embodiment of an electronic search window that produces readable output based on string based searching.

FIG. 2A is a demonstration of a search window that may be used to capture a search request 50 and produce a search result 60. Shown is a typical search engine window having a search query box 52, a search result pane 62, and an advertisement pane 64. The search request 50 may preferably be in the form of a search string, and a search result 60 may be presented as a list of possible links. In other alternatives, the search request 50 may be a list of objects, such as but not limited to an object, a shape, a color, or a human readable or a machine readable string. The search result can also be presented as a series of objects, excerpts from file or a list that may be saved to a file or a table in a database.

The search request 50 is preferably submitted to the automated software agent 130 via an API call or an http put statement or any other inter-process communication between the front end browser or user interface utility and the back end processes of the automated software agent 130. The automated software agent 130 then looks through the data search results bank 110 for any prior instances of the same or similar search. Such a data search bank 110 may be stored locally as illustrated in FIG. 1 or may be stored remotely as shown in FIG. 2. Once a prior search and the associated intelligent client identification information is located, the data retrieval process 90 is performed to obtain the contents of the search. The desired data search result 70 is then sent as a search result 60 to the requesting intelligent client 20. The automated software agent 130 on this intelligent client 20 posts the search result 60 into the search result pane 62. If the data search result 70 was located locally, it is directly posted into the search result pane 62.

During the process of receiving search queries 50 and processing search results 60, the automated software agent 130 preferably also updates the local search results bank 110 with this most recent search and result set 50 and 60. Such update is preferably done with a local search result bank 110 as well as on the data search result banks 110 on other intelligent clients 40 or on the central intelligence unit 80. The advertisement pane 64 is not necessary for the present invention, but does usually appear in a typical search engine.

Figure 3:
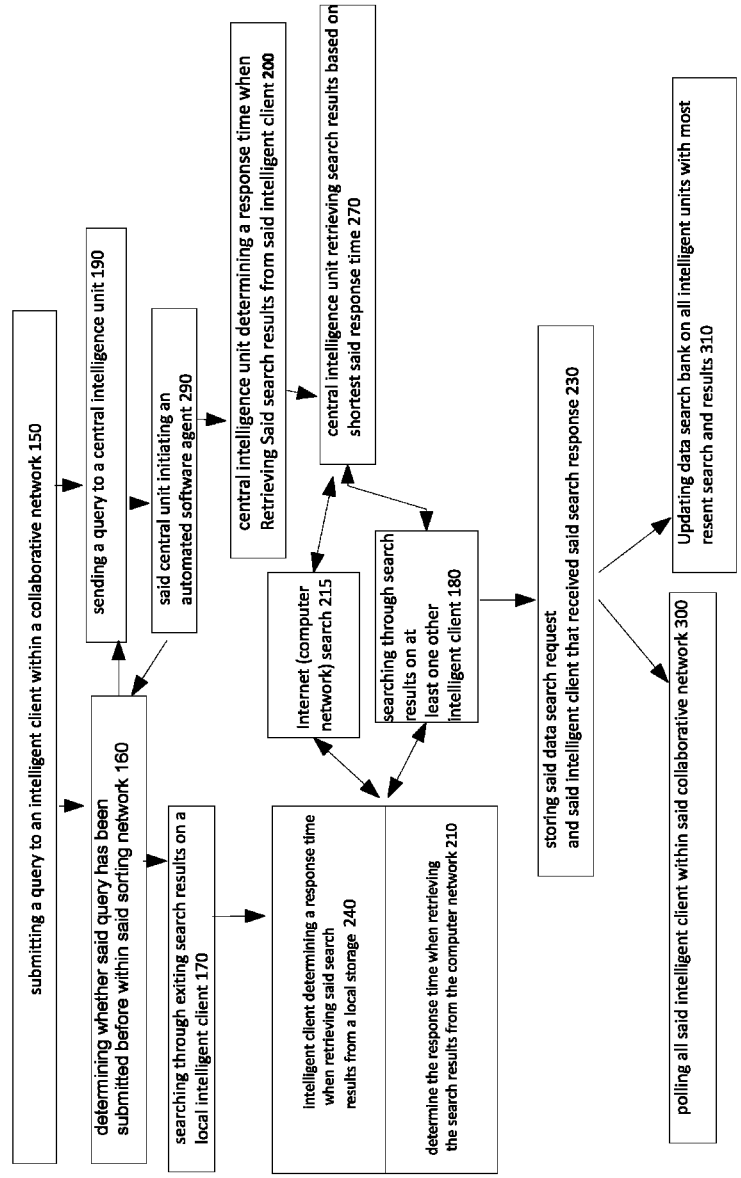
FIG. 3 is a flow diagram illustrating the steps of the disclosed method.

FIG. 3 illustrates the method of facilitating network searching that is embodied in the present invention. Shown are steps of submitting a query to an intelligent client within a collaborative network 150. Such a query 50 may be submitted by a user using an input screen as shown in FIG. 2A or it can be submitted by another application that is able to interact with automated software agent 130 or which is capable or initiating internet searches, for example, Microsoft Office® application suite.

The step of determining whether said query has been submitted before within said sorting network in step 160, may be performed by the software agent 130 running on the intelligent client 20 or 40 or by the automated software agent 130 running on the central intelligence unit 80. In a physical embodiment shown in FIG. 1, the automated software agent 130 may or may not send search queries 50 to the central intelligence unit 80. In another physical embodiment of the claimed method shown in FIG. 2, it is preferably to have a step of first sending a search request to the central intelligence unit 190, which would then determine whether said query has ever been submitted before within the sorting network 160.

The next step is to try to retrieve a search result by searching through the exiting search results on a local intelligent client 170. An automated software agent 130 (FIGS. 1 and 2) may alternatively refer immediately to the data search banks 110 residing on the other intelligent clients 40 or on the central intelligence unit. However, that would overlook any results on the local intelligent client 20.

The search for results may immediately proceed to the step of searching through search results on at least one other intelligent client, step 180. However, for the sake of efficiency it may be more preferable to first determine a response time when retrieving said search results from a local storage 240 and/or to determine the response time when retrieving the search results from the computer network 210. Similarly, in an embodiment where the query is sent to the central intelligent unit, step 190, it would be preferable that the central intelligence unit 80 would first determine or estimate the response time when retrieving the search results from an intelligent client 20 or 40, and when searching directly using the internet, step 200. Step 215, or internet search, is performed if a direct internet (computer network) search is calculated to be more efficient. The central intelligence unit 80 or the intelligent client 20 or 40 would then retrieve results in step 180 from either the internet or from within the collaborative network 10, based on the shortest response of these two resources.

In step 230, a data search request 50 and a response 60 are then stored on the intelligent client 20 or 40, or on the central intelligence unit 80, or in a location separate from intelligent clients 20 or 40 and central intelligent unit 80. The coordinates of all members of the collaborative network 10 as well as their operational status is preferably updated at regular intervals by a polling agent or process that may be a separate process or a sub-utility of the automated software agent 130. In step 310, the same or different utility may also update all of the intelligent clients and/or central intelligent units with information learned through step 300. In step 310 all of the search result banks 110 are updated with the most recent search results 60 and requests 50 processed by each intelligent client 20 and 40.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A collaborative searching network comprising:
   at least one intelligent client;
   a network medium capable of linking said intelligent client with at least one other intelligent client;
   said at least one intelligent client sending a data search request to said one other intelligent client;
   said at least one other intelligent client responding to said data search request with a data search result;
   said at least one intelligent client capable of receiving at least one other data search request from said at least one other intelligent client;
   said at least one intelligent client capable of responding to said one other data search request with a data search result; said at least one intelligent client and said other intelligent client responding to said data search request by retrieving data from at least said one other intelligent client or from a computer network;
   said computer network being comprised of computers that do not participate in said collaborative search network;
   said at least one intelligent client and said at least one other intelligent client are capable of building a data search result bank on each said at least one intelligent client and said one other intelligent client by recording said data search response;
   wherein future data responses to data search requests may be retrieved from said data search result bank on each said at least one intelligent client or said one other intelligent client;
   wherein said one intelligent client and said one other intelligent client that receive said data search result are capable of directing further data search requests to said data search result bank;
   a central intelligence unit;
   said central intelligence unit coordinating said intelligent clients;
   wherein said central intelligence unit functioning as a coordinating unit of said collaborative searching network; and
   wherein said at least one intelligent client functioning as a responding unit of said collaborative searching network.

2. The collaborative searching network of claim 1,
   wherein said intelligent client is capable of sorting said data search result, and
   wherein said intelligent clients include an authenticating module to authenticate queries from each other intelligent client.

3. The collaborative searching network of claim 1,
   wherein said central intelligence unit is capable of evaluating a desired search result from said central intelligence unit or said computer network.

4. The collaborative searching network of claim 1, wherein said data search result bank is compiled by storing said data search queries along with identification for said intelligent client receiving said data search results.

5. The collaborative searching network of claim 1,
   wherein said central intelligence unit is capable of building a data search result bank by storing said data search queries along with an identifying information about said intelligent client receiving said data search results.

6. The collaborative searching network of claim 1,
   wherein said central intelligence unit is capable of determining which of said intelligent clients is likely to contain said search result.

7. The collaborative searching network of claim 1,
   wherein said intelligent client further comprises an automated software agent, said automated software agent polling other said intelligent clients;
   said intelligent client capable of updating said data search result bank with data collected by said automated software agent.

8. The collaborative searching network of claim 7, wherein said software agent is executing locally on said intelligent client.

9. The collaborative searching network of claim 7, wherein said software agent is capable of synchronizing said data search result bank on said intelligent client and on said other intelligent client.

10. The collaborative searching network of claim 1,
    wherein said central intelligence unit further comprises an automated software agent, said automated software agent polling said intelligent clients;
    said central intelligence unit capable of updating said data search result bank with data collected by said automated software agent; and said central intelligence unit capable of authenticating said intelligent clients.

11. The collaborative searching network of claim 10, wherein said software agent is executing locally on said central intelligence unit.

12. The collaborative searching network of claim 10, wherein said software agent is executing in a separate location.

13. The collaborative searching network of claim 10, wherein said software agent is capable of synchronizing said data search result bank.

14. The collaborative searching network of claim 1, wherein said intelligent client is capable of responding to said other intelligent client with said data search result while simultaneously sending a data search request to said other intelligent client.

15. A method for facilitating network searching comprising the steps of:
submitting a data search request to an intelligent client from another intelligent client, said intelligent client and said another intelligent client residing within a collaborative network;
utilizing a search result bank to determine whether said data search request has been submitted before within said collaborative network;
retrieving a search result to said data search request from at least one intelligent client; said intelligent client capable of sending another data search request to said another intelligent client;
said intelligent client and said another intelligent client recording a coordinate value of said intelligent client that received said search response in said search result bank; and
wherein said intelligent client and said another intelligent client use said search result bank to retrieve future data search responses.

16. The method of claim 15, further comprising the steps of:
sending said data search request to a central intelligence unit, said central intelligence unit capable of tracking said intelligent clients within said collaborative network;
said central intelligence unit responding to said query by retrieving said search result from at least one other intelligent client within said collaborative network or from a computer network; said computer network comprising computers that do not participate in said collaborative network; said at least one intelligent client receiving said response; and said central intelligence unit responding to said query by retrieving said search result from said collaborative network or from said computer network.

17. The method of claim 16, further comprising the step of:
central intelligence unit storing said data search request and an identity of said intelligent client that received said search response.

18. The method of claim 16, further comprising the steps of:
said central unit initiating an automated software agent, said software agent capable of accessing all said intelligent clients within said sorting network;
polling all said intelligent client within said collaborative network; and
updating a tracking mechanism on said central intelligence unit with information discovered by said automated software agent.

19. The method of claim 15, further comprising the steps of:
an automated software agent initiated on said intelligent; said automated software agent capable of determining whether a search result can be obtained from said collaborative network; and
wherein said software agent is capable of directing said search request to a computer network if said collaborative network does not contain said search result wherein said computer network is comprised of computers not participating in said collaborative network.

20. The method of claim 19, further comprising the steps of:
said software agent determining a site likely to contain said search result; said site comprising a local storage, at least one other intelligent client and said computer network; and
said intelligent client retrieving said search results.

* * * * *